US012564836B2

(12) United States Patent
Graves et al.

(10) Patent No.: US 12,564,836 B2
(45) Date of Patent: Mar. 3, 2026

(54) POSITIONALLY ASSISTED NEGATIVE PARTICLE REJECTION (PANR) TO SORT AND ENRICH TARGET CELLS OF INTEREST

(71) Applicant: BennuBio, Inc., Albuquerque, NM (US)

(72) Inventors: Steven Graves, Santa Fe, NM (US); James Freyer, Albuquerque, NM (US); Travis Woods, Albuquerque, NM (US)

(73) Assignee: BennuBio, Inc., Albuquerque, NM (US)

( * ) Notice: Subject to any disclaimer, the term of this patent is extended or adjusted under 35 U.S.C. 154(b) by 0 days.

(21) Appl. No.: 17/048,311

(22) PCT Filed: Apr. 24, 2020

(86) PCT No.: PCT/US2020/029706
§ 371 (c)(1),
(2) Date: Oct. 16, 2020

(87) PCT Pub. No.: WO2020/219800
PCT Pub. Date: Oct. 29, 2020

(65) Prior Publication Data
US 2022/0355295 A1    Nov. 10, 2022

Related U.S. Application Data

(60) Provisional application No. 62/837,769, filed on Apr. 24, 2019.

(51) Int. Cl.
| | |
|---|---|
| *B01L 3/00* | (2006.01) |
| *G01N 15/10* | (2024.01) |
| *G01N 15/1434* | (2024.01) |
| *G01N 15/149* | (2024.01) |
| *G05D 21/02* | (2006.01) |

(52) U.S. Cl.
CPC .... *B01L 3/502761* (2013.01); *G01N 15/1434* (2013.01); *B01L 2200/0652* (2013.01); *B01L 2300/0654* (2013.01); *B01L 2300/0864* (2013.01); *B01L 2400/0424* (2013.01); *B01L 2400/0436* (2013.01); *B01L 2400/0439* (2013.01); *B01L 2400/065* (2013.01); *G01N 2015/1006* (2013.01); *G01N 15/149* (2024.01); *G05D 21/02* (2013.01)

(58) Field of Classification Search
CPC ....... B01L 3/502761; B01L 2200/0652; B01L 2300/0654; B01L 2300/0864; B01L 2400/0424; B01L 2400/0436; B01L 2400/0439; B01L 2400/065; B01L 2400/0463; B01L 2400/06; G01N 15/1434; G01N 2015/1006; G01N 2015/149; G01N 15/1459; G01N 15/1404; G01N 15/147; G01N 2015/0038; G01N 2015/142; G01N 2021/8592; G01N 2015/1422; G05D 21/02
See application file for complete search history.

(56) References Cited

U.S. PATENT DOCUMENTS

| | | | |
|---|---|---|---|
| 8,149,402 B2 | 4/2012 | Rich et al. | |
| 2008/0302732 A1 | 12/2008 | Soh et al. | |
| 2009/0071225 A1* | 3/2009 | Schilffarth | G01N 15/0205 73/1.02 |
| 2015/0268244 A1* | 9/2015 | Cho | G01N 15/1459 435/7.23 |

FOREIGN PATENT DOCUMENTS

| | | |
|---|---|---|
| JP | 2017516073 A | 6/2017 |
| WO | 2018148194 A1 | 8/2018 |

OTHER PUBLICATIONS

Cho et al., Biomicrofluidics, vol. 4 (043001), pp. 1-23, (Year: 2010).*

* cited by examiner

*Primary Examiner* — Cynthia B Wilder

(74) *Attorney, Agent, or Firm* — Lee & Hayes, P.C.

(57) ABSTRACT

Novel methods and apparatus for sorting and enriching target cells of interest from a mixture.

18 Claims, 7 Drawing Sheets

POSITIONALLY ASSISTED NEGATIVE PARTICLE REJECTION (PANR) TO SORT AND ENRICH TARGET CELLS OF INTEREST

CROSS-REFERENCE TO RELATED APPLICATIONS

The following application claims benefit of U.S. Provisional Application No. 62/837,769, filed Apr. 24, 2019, which is hereby incorporated by reference in its entirety.

BACKGROUND

Sorting and enrichment of desired cells and particles from a mixture is of great interest to many fields (Robinson and Roederer 2015, Shields IV, Reyes et al. 2015, Gabriel, Calleja et al. 2016). Multiparameter single cell sorting is critical to many fields, but it is too slow for many important applications [1-4]. Therefore, techniques that rapidly enrich a subset of cell types based on their physical properties (e.g. size, density, compressibility) are often used as the first step of multiparameter sorting to speed up the overall cell separation process [2, 4-6]. However, added enrichment steps increase the chance that rare cells will be lost while also increasing the complexity and cost of sorting [5]. What is needed are approaches that enable high-speed multiparameter cell and particle sorting, regardless of cell and particle size.

For the purposes of the present disclosure, the term "sorting" is intended to mean the isolation of a very specific cell or particle type on a one by one basis based on its cellular function or particle characteristics, identification of which usually requires the detection of several biological or physical markers. "Enrichment" is defined as increasing the relative concentration of a given cell or particle type as compared to the starting mixture of cells or particles. Finally, for simplicity, while the present disclosure may refer to biological "cells," it will be understood that present disclosure is equally applicable to other particles in an aqueous fluid (e.g. microspheres, multicellular aggregates, small organisms, nanoparticles (including biological nanoparticles such as viruses and prions) etc.)

Enrichment processes are fast, but do not provide high purity, as most cells have similar physical properties [2]. Enrichment steps such as the lysis of RBCs to enrich for WBCs [7] or micro-post arrays to separate WBCs [8] are successful because of the significant physical differences between RBCs and WBCs. The efficiency of such approaches makes the development of similar techniques to separate target cells indicative of disease a highly sought-after goal [9-12]. While some diseases (e.g. malaria) result in physical changes to enable efficient physical separation [6], most do not result in large enough changes of cellular properties to provide high-purity enrichment from the background cells that have a diversity in physical properties [6]. Moreover, cells of the same type can display significant physical variation from one individual cell to the next, meaning that systems that rely solely on physical properties to sort or enrich cells may identify different types of cells as being more similar than two cells of the same type.

Nonetheless, many enrichment approaches have been pursued: including deterministic lateral displacement [13-15], inertial focusing [16-20], acoustophoresis [21-23], dielectrophoresis [24-26] and a myriad of other approaches. While the label free nature and throughput of such approaches is desirable, there is no current enrichment approach that provides comparable purity to that of multi-parameter sorting.

Another approach, magnetic activated cell sorting (MACS), sorts cells via the binding of magnetically tagged antibodies, followed by magnetic capture [27, 28]. MACS is fast, gentle, and high-throughput, but does not lead to high purity isolation of most rare cell types that require several cellular markers to identify. The only way to do multiparameter sorting via MACS involves sequential washing and sorting steps since each sort is binary [29].

Comparatively, fluorescently activated cell sorting (FACS) can sort cells on >20 cellular markers simultaneously [30, 31]. Using FACS, it is possible to isolate relatively rare cells (typically labelled with fluorescent antibodies) at near 100% purity in a few hours [30, 31]. These properties have resulted in FACS being the primary technology for the isolation of cellular populations [30-32]. In FACS, optical analysis is performed as the cells pass by in a flowing stream and cells of interest are labeled so that they emit light at specific wavelengths after excitation with an intense light source [32]. As many colors of fluorescence can be identified simultaneously this allows cells to be identified by the types of molecules that they are expressing or displaying, which is often the only way to differentiate different cell types [30, 31]. Each cell is identified in real time as it passes through the system and a sort signal is sent to divert cells of interest via a sort mechanism [32]. The typical sort mechanism uses a piezo drive to induce droplet formation as the high-speed fluid exits a nozzle. Only the droplets that contain the desired cells are electrostatically charged, that charge is used to divert the droplet as it passes oppositely charged plates and successfully sort the cell. The small droplet volume and high-speed timing of the FACS system enables this approach to sort at rates of up to 50,000 cells per second [32]. In contrast, recent advances in microfluidics have made it possible to, instead, use valves that open and close at 30 KHz to provide nearly matching sorting rates [33, 34]. However, the use of hydrodynamic focusing and/or microfluidics in these commercial systems typically presents as flow rates <100 mL/min for sample delivery, which precludes sorting of large volume samples. Therefore, pre-enrichment steps are used prior to flow sorting for rare cell populations. Unfortunately, such steps add complexity, require additional processing time, and lead to loss of rare cells—all of which are highly problematic for rare cell isolation from large volume samples.

For particles larger than single cells (i.e. >50 mm in diameter) the choice of sorting technology becomes even more restrictive. Large particle sorting technology exists and is similar to the FACS approach described above, but sorting is accomplished using a puff of air to displace a flowing jet in air stream [35, 36]. Due to limitations with hydrodynamic focusing of larger particles and the relatively slow sort mechanism, this approach is limited to sorting of about 100 particles per second at ~200 mm diameter and even slower for larger particles.

For the above reasons, creation of approaches to accurately isolate cells and other particles in simple, fast, and gentle fashion remains a significantly valuable challenge to be overcome. Most of the proposed improvements have pursued microfluidic solutions and there are many commercially available microfluidic cell sorters [37]. Nonetheless, the volumetric rate of cell sorting is limited to about 100 μl/min with an effective sorting rate of about 50K cells/sec (and much lower for larger particles). This is a serious limitation for sorting large numbers of rare cells (e.g. stem cells for therapy) because these approaches cannot analyze enough sample in a reasonable time to produce a large yield of the rare cell population.

Despite this research and commercial development, the basic limits of fluorescent activated cell sorting remain. Most current approaches use microfluidics and extremely fast valves to ensure that each sort step is as fast as possible and that the smallest sort volume possible is used. This approach is inherently limited to sort rates of about 50,000 events per second due to the stochastic arrival of particles and the rapid increase in system pressure as linear velocity increases.

Because of such limitations, alternative sorting approaches have been considered. For example, Ensemble-decision aliquot ranking (EDAR) uses a laser to generate fluorescence signal from many cells in an aliquot of sample within a microfluidic channel, which dramatically reduces its ability to resolve true positive signals from that generated by background binding of multiple antibody types to cells coincident in the aliquot [38, 39]. Following analysis, the aliquot flows into a junction that provides input buffer from both sides to focuses the flowing aliquot of cells into the central channel of three exit channels. Using solenoid valves to control the flow of input buffer enables EDAR to sort aliquots to either of the side exit channels. Beyond EDAR, there have been many other approaches including: piezo-electric drives to switch flows or cells [40-42], lasers to move cells [43]. All of these approaches are limited by throughput and sorting rates.

Accordingly, there remains a need for systems that are able to quickly and accurately sort and/or enrich for desired cells in a mixed sample or population.

SUMMARY

According to various embodiments, the present disclosure provides novel methods and apparatus for sorting and enriching target cells of interest from a mixture.

BRIEF DESCRIPTION OF THE DRAWINGS

FIG. 2A shows cells being positioned by an acoustic standing wave produced by a PZT drive.

FIG. 2B shows a cell of interest arriving in the interrogation area.

FIG. 2C shows a signal being generated by the detection system such and the rejection channel valve closing.

FIG. 2D shows the cell of interest having flowed into collection channel and the rejection channel valve opening.

FIG. 2E shows the system having reverted to the open valve state.

DETAILED DESCRIPTION

According to an embodiment the present disclosure provides novel methods and apparatus for sorting and enriching target particles of interest from a mixture. According to various embodiments described below, the novel methods and apparatus for sorting and enriching target particles of interest are referred to as Positionally Assisted Negative particle Rejection (PANR).

Figure 1:
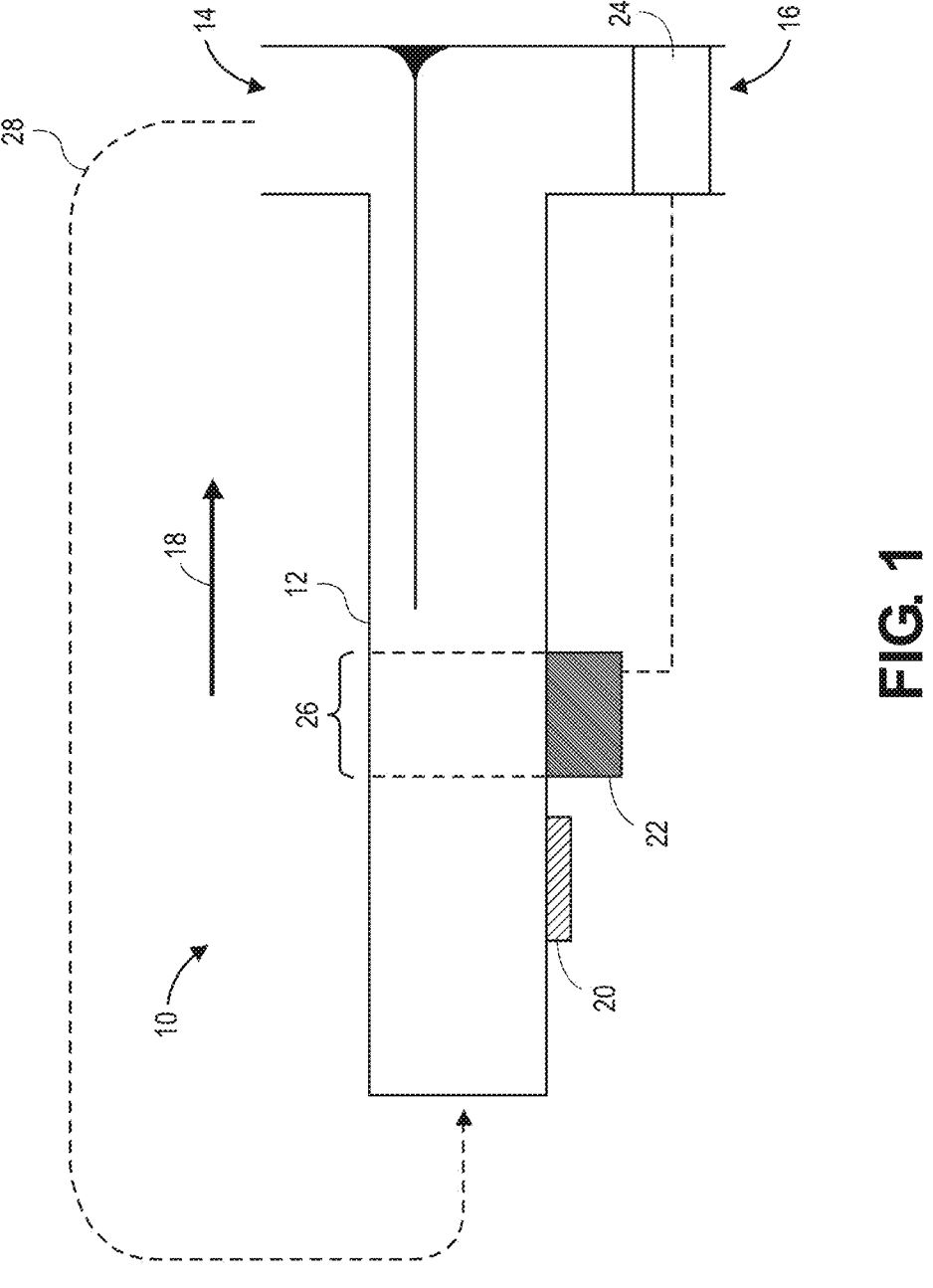
FIG. 1 is a schematic illustration of a PANR system according to an embodiment of the present disclosure.

FIG. 1 is a schematic illustration of a PANR system according to an embodiment of the present disclosure. In general, system 10 includes a flow channel 12 which is partitioned at the distal end to produce a collection channel 14 and a rejection channel 16. The intended flow direction is shown with arrow 18. (For clarity, in the present disclosure, the terms proximal and distal are used with reference to the intended direction of flow within the device during standard operation such that a fluid sample typically flows from the proximal end to the distal end of a channel.) The proximal end of channel 12 includes a particle positioning/focusing device 20. The particle positioning device positions (or focuses) particles within channel 14. In PANR, particle positioning accomplishes at least two tasks: first, each particle is positioned so that it can be interrogated by detector 22, second, each particle is positioned so that it will flow, by default, through rejection channel 16. Detector 22 is in communication with valve 24.

In operation, particles in a sample are introduced at the proximal end of the collection channel, where they are positioned (or focused) by device 20. Device 20 may be, for example, any device capable of positioning the particles to accomplish the tasks identified above. Suitable devices include apparatus capable of producing acoustic standing waves such as a piezoelectric transducer (PZT) drive. Other devices or positioning methodologies that could be employed include, but are not limited to, micropost arrays for deterministic lateral displacement, inertial focusing, and dielectrophoretic focusing. Additionally, methods of positioning that require the addition of fluid, such as hydrodynamic focusing, would also work as long as all of the additional fluid was accounted for in the calculations and the approach.

After being focused, the particles are interrogated by detection device 22. In general, detection device 22 is capable of distinguishing a single or very few particles of interest from background particles. (See, e.g., ref 44-48) According to a specific embodiment, detection device 22 includes a focused light source such as a laser and an optical detector. In this embodiment, once the particles are positioned, they flow through interrogation zone 26 where they encounter the focused light and emit optical signals that are analyzed by the optical detector, which determines whether any particular particle is a particle of interest. Of course it should be understood that while optical signal detection is shown, any method of interrogating the cell (imaging, ultrasound, etc.) would work as long as it can identify the particle of interest and provide a signal when a particle of interest is detected.

Detection device 22 is then in communication with valve 24. In normal operation, when no particle of interest is detected, valve 24 is open and the sample fluid flows out of the detection channel and through rejection channels 16 and collection channel 14. Importantly, positioning device 20 has specifically positioned all the particles within channel 12 such that any particles in the detection channel will naturally flow through rejection channel 16 (this may also be referred to as a discard, or discharge channel), even while a smaller volume of fluid (without particles) flows into the collection channel 14.

In contrast, when detection device 22 identifies a particle of interest, it sends a signal to valve 24 to close the valve, which redirects particles within the interrogation zone towards and out through collection channel 14. As shown by dotted arrow 28, if desired, collected particles of interest (and any background stragglers) can then be recirculated back to the proximal end of the device for one or more additional rounds of sorting/enrichment.

The channels and valves may formed from standard materials commonly used in fluidic and microfluidic industries and may be manufactured using standard techniques including, but not limited to micromachining, microlithography, etching, 3D printing, etc. [50] Suitable solenoid valves can be manufactured or are commercially available. For example, suitable commercially available solenoid valves having 200 µs response times are available from TLX Technologies (Pewaukee, Wis.).

While FIG. 1 depicts a single flow channel, which may or may not enable automatic recirculation of the collected particles of interest, as explained in greater detail below, the present disclosure contemplates arrangements wherein multiple flow channels are used in parallel and/or in sequence in order to process large sample volumes quickly. It will also be understood that such multi-channel arrangements could be designed to detect and collect one or more types of particles of interest. Moreover, more than one type of particle of interest could be identified as a particle of interest by detection device 22. Accordingly, in various embodiments, the presently described system could be designed to identify and collect more than one specific type of particle— simultaneously (i.e. within the same flow channel), in parallel (i.e. within multiple flow channels operating at the same time) or in sequence (i.e., a first pass detects one type of particle while a second pass detects another type of particle.)

Figures 2A, 2B, 2C:
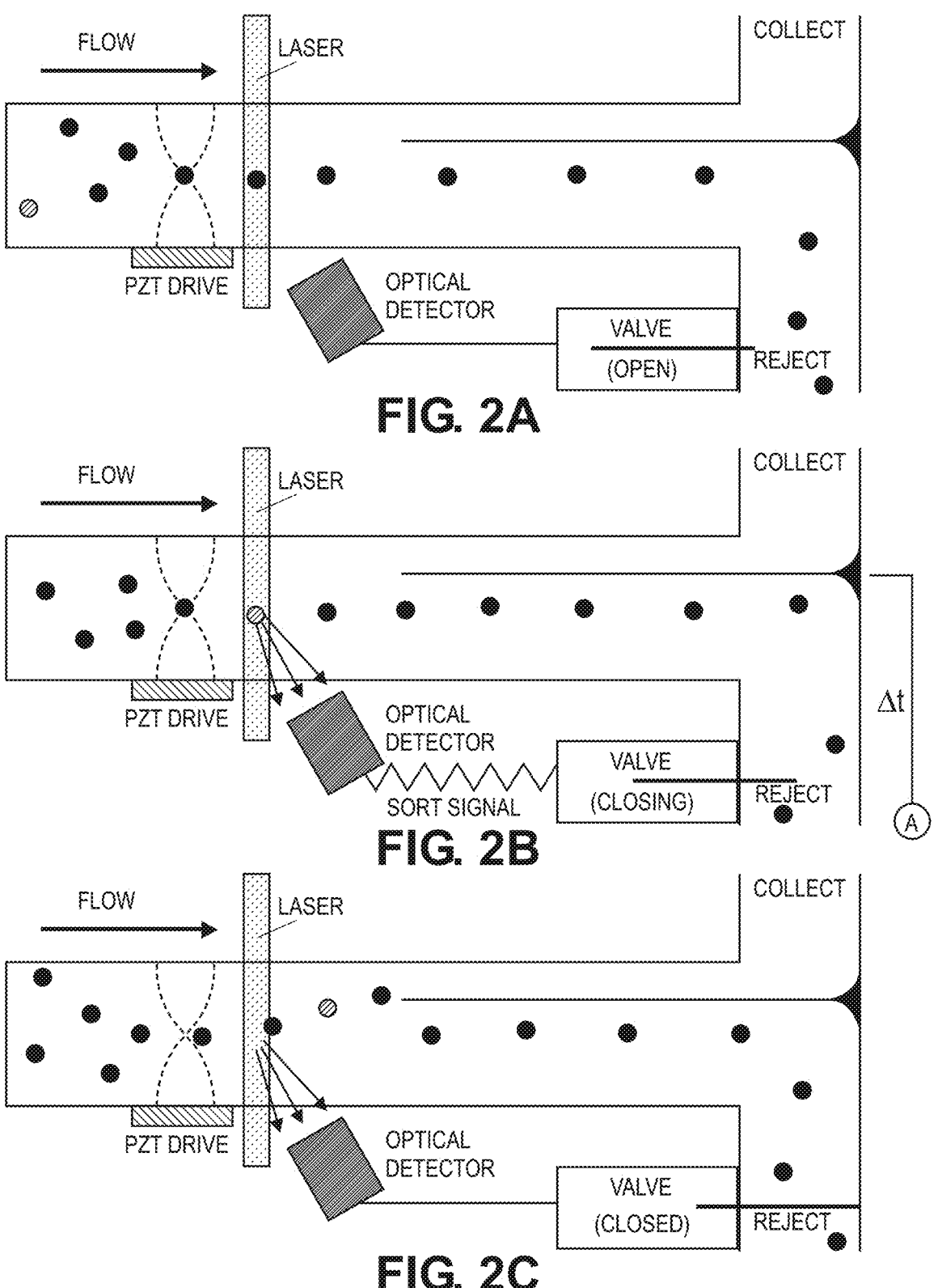
FIGS. 2A-2E are schematic illustrations of a non-limiting exemplary device in use to detect, sort, and enrich for target cells of interest.
Figure 2D:
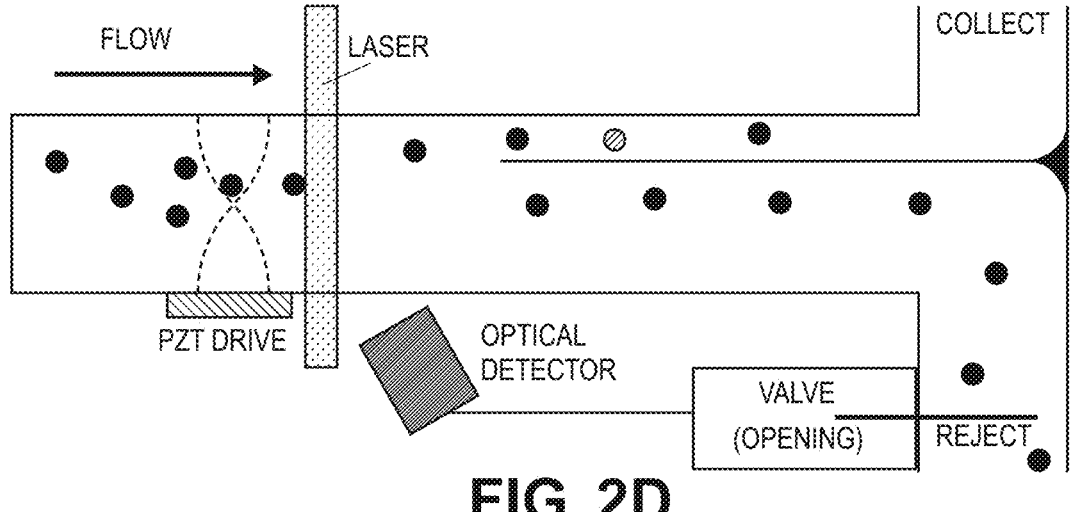

FIG. 2A-2E are schematic illustrations of a non-limiting exemplary device in use to detect, sort, and enrich for target cells of interest. In the depicted embodiment, a fluid sample containing both background cells (dark circles) and target cells of interest (light circles) enters at the left (proximal end) of the channel and flow to the right, as shown by the arrow. FIG. 2A shows the cells being positioned by an acoustic standing wave produced by a PZT drive. Once the cells have been positioned, they flow through the laser beam and emit optical signals that are analyzed by the detector. Determination of whether a particular cell is of interest is made by analysis of emitted optical signals. As shown, so long as only background cells are detected, the rejection channel valve is open and all the cells flowing through the device exit via the rejection channel, while a small amount of fluid (without cells) flows through the collection channel. In this "open valve" state, and as explained in greater detail below, the volume of fluid that is directed through a given channel is determined by the relative cross-sectional area of the channel opening to the total area of the channel.

Of course it will be understood that FIGS. 2A-2E only show one example of multiple possible various design configurations, including, for example single- or multi-valve designs where fluid only flows through the collection channel after a cell of interest is identified.

Figure 2E:
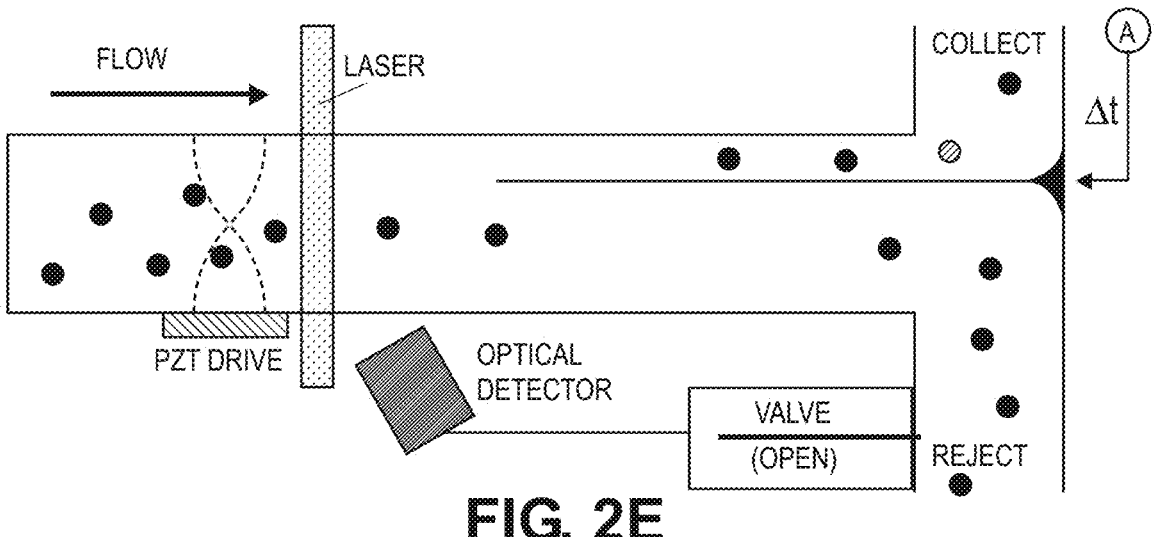

Returning to the configuration shown in FIGS. 2A-2E, if a cell of interest arrives in the interrogation area (FIG. 2B), a signal is generated by the detection system that triggers the valve on the rejection channel to close (FIG. 2C). In this "closed valve" state, the flow of the rejection channel is stopped, which forces all flow through the open collection channel. As all flow is forced through the collection channel, all cells and all fluid will be directed through the collection channel. After the cell of interest is predicted to have flowed into the collection channel, the valve begins to open (FIG. 2D) and the system reverts back to the open valve state (FIG. 2E).

In this way, all cells of interest are collected into the collection channel. Of course, if the valve is in the closed state long enough background cells are also collected. However, if the target cells are relatively rare as compared to the background cells (discussed in detail below), most background cells will be diverted to the rejection channel and all target cells will be retained in the collection channel. This will result in an effective enrichment of the number of target cells relative to background cells.

Intuitively it can be seen that this process will result in numerical enrichment of cells of interest and that repeated use of this approach (i.e. passing the collected volume back through the system) will eventually result in only target cells of interest in the collection channel Thus, initial passages through the system will result in target cell enrichment and repeated passages will result in an effective sorting process, where target cells of interest are the only remaining cells in the collection volume. Of course, at the end of repeated processes the target cells may be at a low concentration in a large volume, but, at that point, very simple cell concentration techniques such as centrifugation or acoustophoresis can be used to collect the cells at any concentration necessary.

Figure 3:
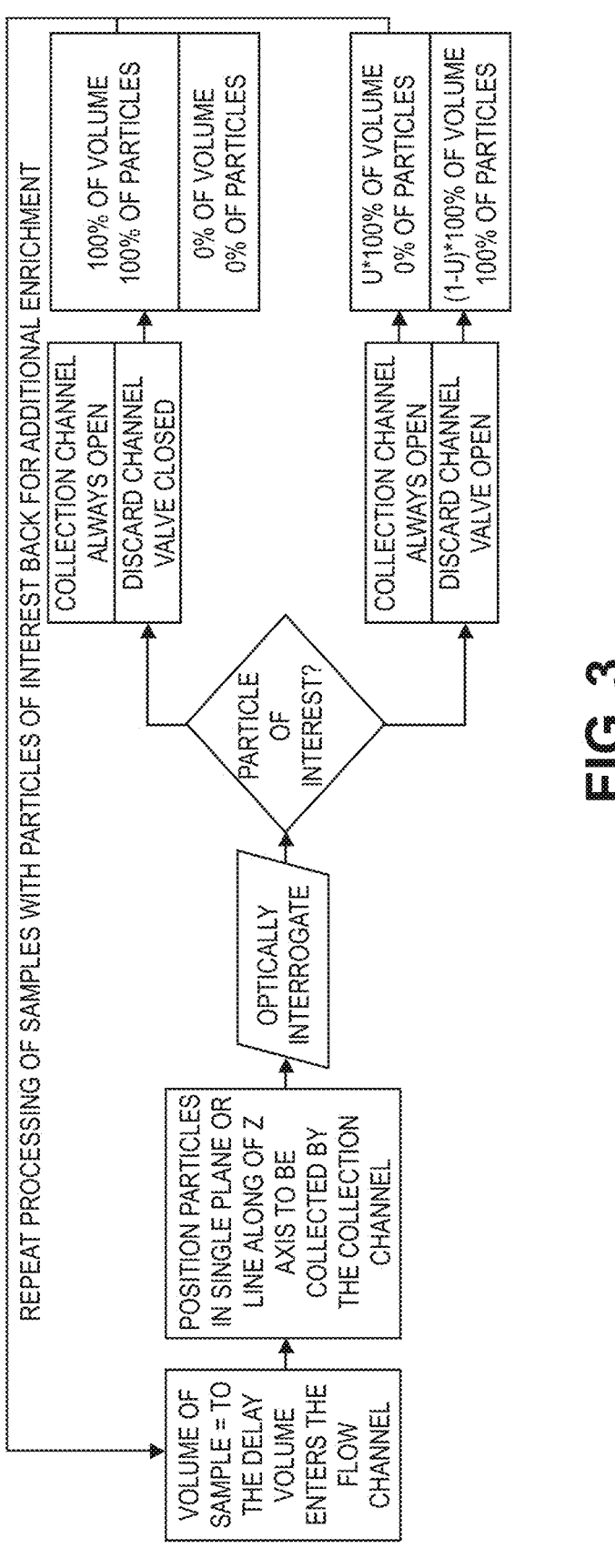
FIG. 3 is a flow diagram showing repeated PANR according to an embodiment of the present disclosure.

Accordingly, use of repeated PANR (referred to herein as rPANR) will result in effective sorting of cells of interest. FIG. 3 is a flow diagram showing this approach.

The system and methods of the present disclosure maximize the fluidic throughput of the system while emphasizing total sample recovery to enable multiple cycles of a fast fractionation of target cells. The target cells are recovered in their natural sample background for additional sorting steps that can occur rapidly. As described below, this paradigm shift will enable rPANR to sort cells from samples as large as a liter and for target cells as rare as 1 per liter in a background of $10^7$ negative cells in automated fashion and in a few hours. Moreover, this process will be somewhat unaffected by particle size. These sort rates are simply not achievable using any other approach and will have great significance in rare cell sorting, high-throughput cell sorting, and large particle sorting. As such, rPANR will be of great value across all aspects of biomedical and clinical research as well as for therapy-scale cell separations.

The PANR process can be described in a series of equations to mathematically model the rPANR process. Equation 1 calculates the delay volume ($V_D$), which is the sample volume that will pass through the collection channel due to the valve closing, where F is the volumetric flow rate (F), f1t is the time it takes the valve to open and close.

$$V_D = F \cdot \Delta t \qquad \qquad \text{Equation 1}$$

Thus, the faster the valve the smaller this volume will be, which will enable a higher enrichment on an individual PANR passage as fewer nonspecific background cells will be present in the $V_D$. Equation 2 calculates the fraction of the total channel cross-sectional area that the collection channel makes up (U), where xArea collection is the cross-sectional area of the collection channel and xArea rejection is the cross-sectional area of the rejection channel.

$$U = \frac{xArea \text{ collection}}{xArea \text{ collection} + xArea \text{ discharge}} \qquad \text{Equation 2}$$

Equation 3 calculates the number of delay volumes that will cause to close (Y), where $C_+$ is the concentration of target cells, $C_-$ is the background cell concentration, and $V_T$ is the total sample volume.

$$Y = \left(1 - e^{-C_+ \cdot V_D} \cdot \frac{(-C_+ \cdot V_D)^0}{0!}\right) \cdot \frac{V_T}{V_D} = \frac{V_T}{V_D} \cdot \left(1 - e^{-C_+ \cdot V_D}\right) \qquad \text{Equation 3}$$

Equation 4 calculates the number of delay volumes where the valve is open (N) where N is calculated by simply subtracting Y from the total number of times the valve can open or close, which is $V_T/V_D$.

$$\begin{aligned} N &= \frac{V_T}{V_D} - Y \qquad \text{Equation 4}\\ &= \frac{V_T}{V_D} - \left(1 - e^{-C_+ \cdot V_D}\right) \cdot \frac{V_T}{V_D}\\ &= \frac{V_T}{V_D} \cdot \left(1 - \left(1 - e^{-C_+ \cdot V_D}\right)\right)\\ &= \frac{V_T}{V_D} \cdot e^{-C_+ \cdot V_D} \end{aligned}$$

Using these constants, we calculate system variables for specific model conditions. For example, Equation 5 calculates the volume that flows into collection channel ($V_C$) during a single cycle of PANR, where we count the number of times the valve is open (Y) and multiply that by the delay volume ($V_D$).

$$V_C = Y \cdot V_D + N \cdot U \cdot V_D = V_D \cdot (Y + N \cdot U) \qquad \text{Equation 5}$$

We also add the volume that passes to the collection channel while the valve is open, which is the number of times that the valve is open (N) multiplied by $V_D$, corrected for the fraction of the volume that will pass through the collection channel (U) during the open valve state. Substituting Equations 3 and 4 into Equation 5, provides Equation 6, which calculates the volume expected to flow into the collection channel based on the total volume of the sample ($V_T$).

$$\begin{aligned} V_C &= V_D \cdot \left(\frac{V_T}{V_D} \cdot \left(1 - e^{-C_+ \cdot V_D}\right) + \frac{V_T}{V_D} \cdot e^{-C_+ \cdot V_D} \cdot U\right) \qquad \text{Equation 6}\\ &= V_T \left(\left(1 - e^{-C_+ \cdot V_D}\right) + U \cdot e^{-C_+ \cdot V_D}\right) \end{aligned}$$

We can also calculate the number of cells that end up in the collection channel ($P_c$) as shown in Equation 7, which is valid for low target cell concentrations and calculates the number of background cells as the number of valve closings (Y) added to the average number of background cells in a $V_D$.

$$P_c = Y + Y \cdot \frac{C_-}{V_D} \qquad \text{Equation 7}$$

As target cell concentrations increase, it becomes more likely that more than one cell will be present in a $V_D$. As such, this model is valid for low target cell concentrations (e.g. $C_+$:50.2 cells per $V_D$, which provides a 98.2% chance of 1 or fewer target cells per $V_D$). By substituting Equation 3 into Equation 7, Equation 8 calculates $P_c$, using known parameters.

$$\begin{aligned} P_c &= Y + Y \cdot C_- \cdot V_D \qquad \text{Equation 8}\\ &= \frac{V_T}{V_D} \cdot \left(1 - e^{-C_+ \cdot V_D}\right) + \frac{V_T}{V_D} \cdot \left(1 - e^{-C_+ \cdot V_D}\right) \cdot C_- \cdot V_D\\ &= \frac{V_T}{V_D} \cdot \left(1 - e^{-C_+ \cdot V_D}\right) \cdot (1 + C_- \cdot V_D) \end{aligned}$$

Equation 9 combines Equations 6 & 8 to calculate the concentration of cells in the collection channel ($C_c$).

$$\begin{aligned} C_C &= \frac{P_C}{V_C} \qquad \text{Equation 9}\\ &= \frac{\frac{V_T}{V_D} \cdot \left(1 - e^{-C_+ \cdot V_D}\right) \cdot (1 + C_- \cdot V_D)}{V_T\left(\left(1 - e^{-C_+ \cdot V_D}\right) + U \cdot e^{-C_+ \cdot V_D}\right)}\\ &= \frac{\left(1 - e^{-C_+ \cdot V_D}\right) \cdot (1 + C_- \cdot V_D)}{V_D\left(\left(1 - e^{-C_+ \cdot V_D}\right) + U \cdot e^{-C_+ \cdot V_D}\right)} \end{aligned}$$

Finally, our model can determine purity as a function of the number of total target cells of interest ($P_+$) divided by the number of cells present in the collection channel ($P_c$), as shown in equations 10 & 11. Equation 10 calculates $P_+$ simply by multiplying the known target cell concentration times the total sample volume ($V_T$) at the start of the process.

Using equations 8 and 10 enables the fractional cell purity (Purity) to be calculated (Equation 11).

$$\begin{aligned} \text{Purity} &= \frac{P_+}{P_C} \qquad \text{Equation 11}\\ &= \frac{C_+ \cdot V_T}{\frac{V_T}{V_D} \cdot \left(1 - e^{-C_+ \cdot V_D}\right) \cdot (1 + C_- \cdot V_D)}\\ &= \frac{C_+ \cdot V_D}{\left(1 - e^{-C_+ \cdot V_D}\right) \cdot (1 + C_- \cdot V_D)} \end{aligned}$$

This model enables useful predictions using real-world parameters, such as the effect of valve response time on $V_D$ in a constructible system. As there are commercially available miniature solenoid valves with 200 µs response times (TLX Technologies, Pewaukee, Wis.), we can assume f1t of 1 ms, which includes the time to send a sort signal to the valve. Using a flow rate (F) of 1 mL/min or 167 µL/s, $V_D$ would be 17 nL. A $C_+$ of 1 cell per 5× the $V_D$ (85 nL), which is <1.2×10$^4$ target cells/ml, ensures the required low cell concentration for our model. At higher $C_+$, more than one target cell may be coincident in $V_D$. In a conventional sorter, this would be problematic, but in PANR operation, within some limitations, it will result in more efficient enrichment as a greater proportion of target cells would be present in the collection channel. However, our model assumes that the valve is mostly open. Thus, the limitation of the system is driven by how often the volume equivalent to $V_D$ preceding the $V_D$ being sorted contains a target cell. If the preceding $V_D$ is occupied by a target cell, the valve will remain closed.

Again, Poisson statistics suggest that, at $1.2 \times 10^4$ target cells/ml, 82% of the time the 17 nL volume preceding the 17 nL $V_D$ being sorted will be clear of target cells. In fact, at concentrations as high as $6 \times 10^4$ target cells/mL, the preceding $V_D$ be clear of target cells 50% of the time, which is likely to be near the limit where PANR will be operational. With regards to the size of the fluidic channels, if we use a 100 μm×100 μm square channel as the lower dimensional limit, this channel would be 1.7 mm long to contain 17 nL. If one considers a system that positions cells to a line and assumes the cells are 10 μm in diameter, this limits the concentration of cells to 170/17 nL if they are packed as beads on a string, which results in a maximum total cell concentration of $1 \times 10^7$ cells/ml. If acoustic cytometry is being used, at these concentrations one would expect to see some coincidences during analysis [49], but it should not be inherently limiting to the optical analysis approach.

Figure 4:
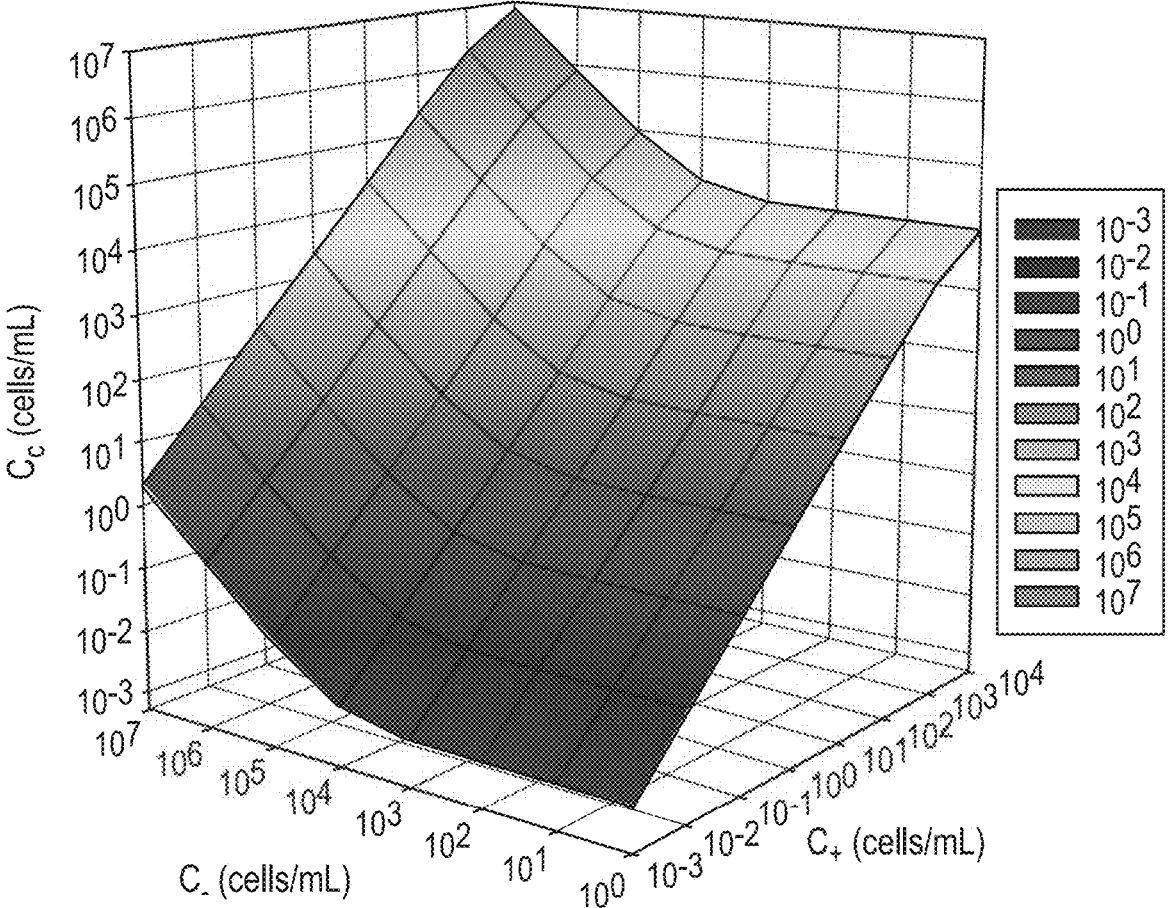
FIG. 4 depicts the concentration in the collection channel (Cc) as a function of target cell concentrations ($C_+$) and background cell concentrations ($C_-$).
Figure 5:
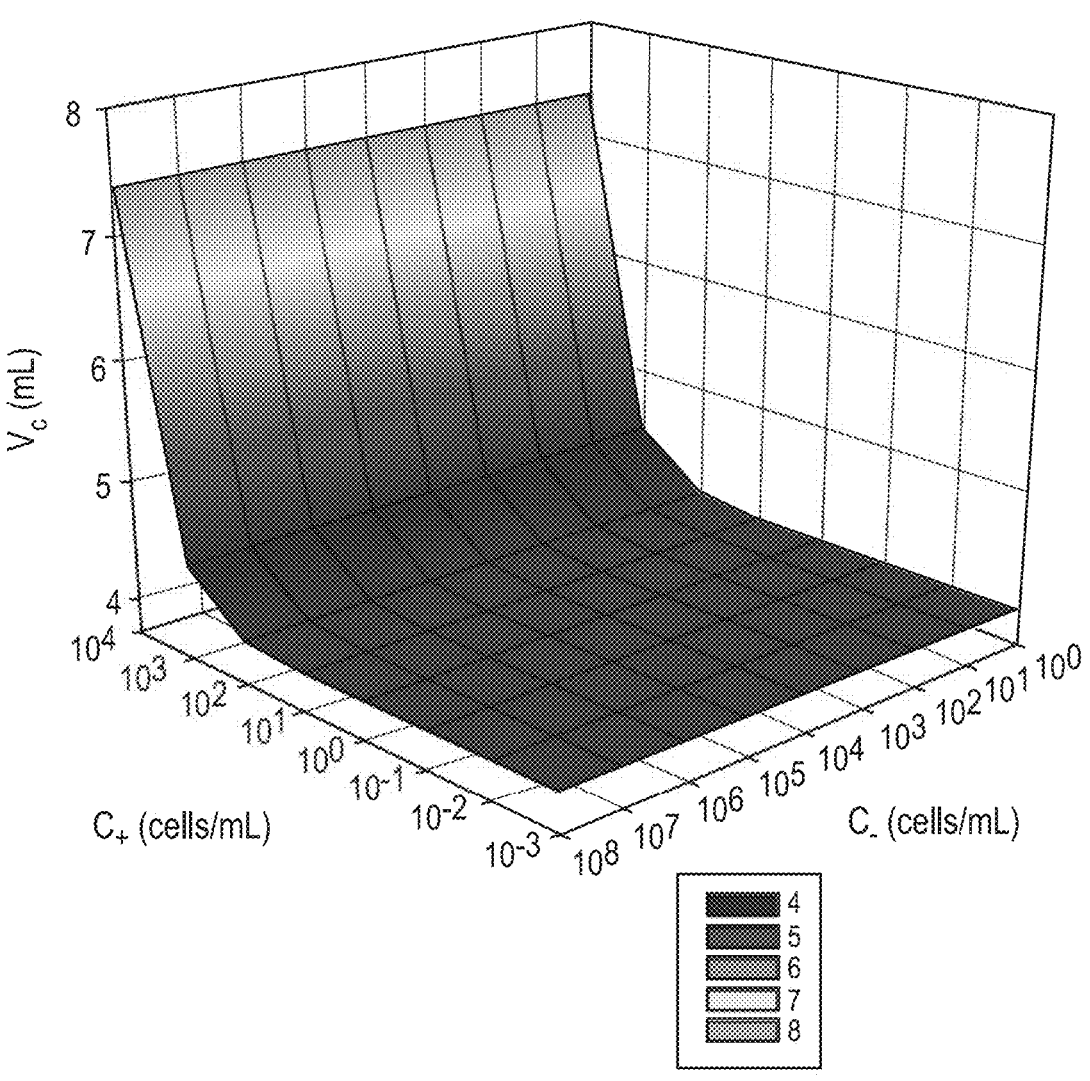
FIG. 5 depicts the Volume (VC) in the collection channel as a function of target cell concentration ($C_+$) and background cell concentration ($C_-$).
Figure 6:
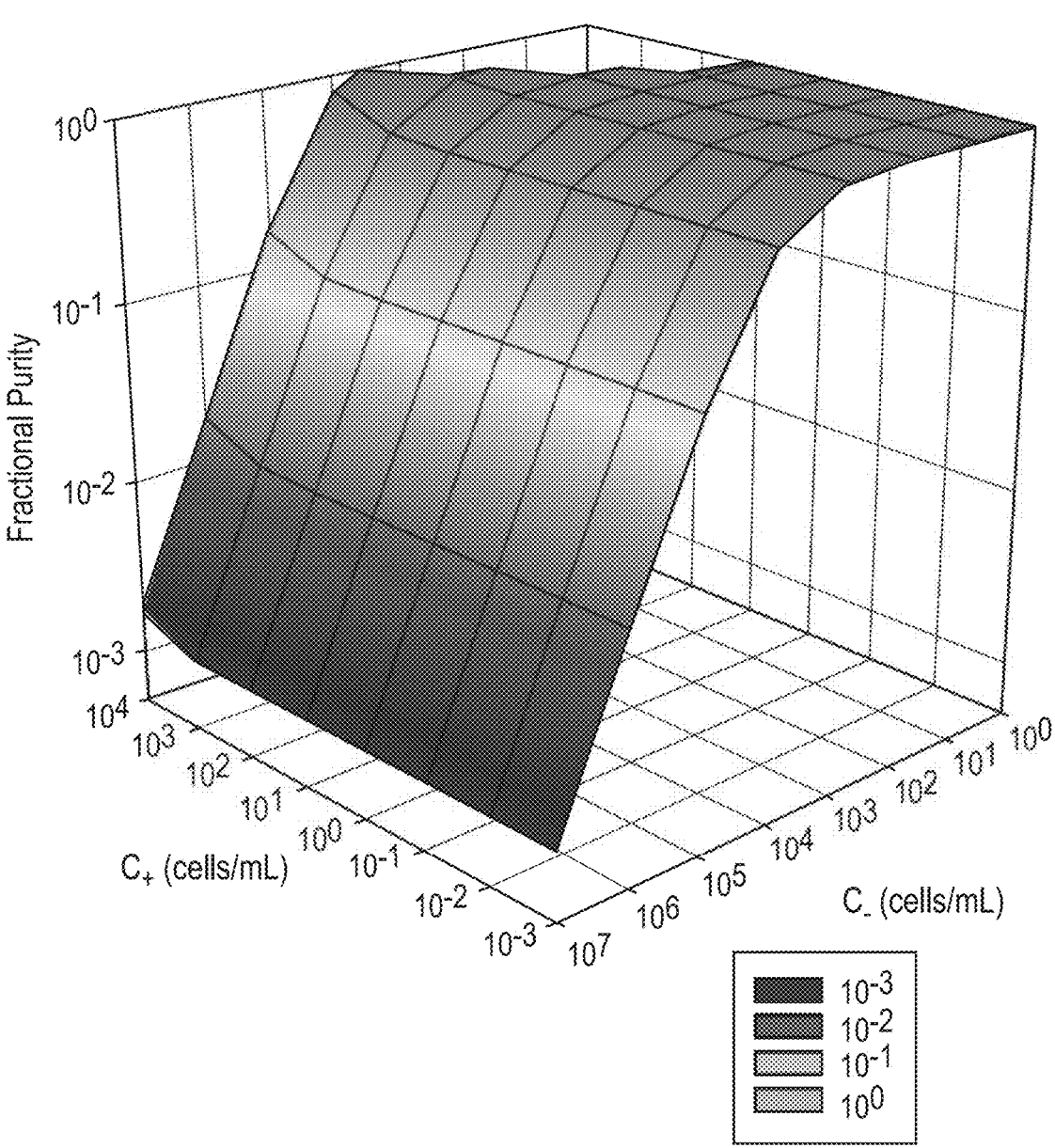
FIG. 6 depicts fractional purity in the collection channel as a function of target cell concentration (C+) and background cell concentration (C−). For situations where C+ is >>C− the fractional purity will go higher than 1 as there will be more than 1 target cell in each sort. This situation is not plotted here.

FIG. 4 examines the concentration in the collection channel (Cc) as a function of target cell concentrations ($C_+$) and background cell concentrations ($C_-$). As can be seen by this plot, starting at high cell concentrations ($10^4$ target cells/ml & $10^7$ background cells/ml) leads to marginal improvement using this approach. In fact, the expected concentration only improves from $10^4/10^7$ to $10^4/7.6 \times 10^6$, which is ~24% enrichment in terms of concentration (i.e. a 24% reduction of background cells). The impact improves as the starting target cell concentration decreases. Starting at $10^3$ and $10^7$, results in an enrichment of 83%, and $10^2$ and $10^7$ provides an enrichment of 98%. FIG. 5 shows that use of $10^4$ target cells results in a ~7.3 mL volume being directed to the collection channel, while $10^3$ provides ~4.5 mL, and $10^2$ starts to approach 4 mL. This is consistent with the fractional volume collected in the model (40%) and the starting volume (10 mL). FIG. 6 examines the total purity of the cells in terms of cell count (positive cells/total cells) it can be seen that starting with $10^4$ positive cells in $10^7$ background cells, only results in an improvement in cell purity of 0.13%, it remains relatively constant even as target cell concentration is reduced (0.12% for 103/mL and 102/mL). However, as the relative starting target cell concentration becomes nearer the background cell concentration (e.g. $10^4$ and $10^6$ cell/mL respectively) this situation dramatically improves by a factor of 10. As the starting background cell concentration decreases to $10^5$ to $10^4$ cells/ml, the ability to achieve a fractional purity of 1 for target cells of interest is clear for target cell populations at concentrations of <$10^4$ cells/ml.

According to an embodiment, the presently described rPANR process can be implemented with a parallel acoustic flow cytometry system, such as the commercially available Velocyt™ system (BennuBio, Inc. Albuquerque, N. Mex.) which can analyze cell samples at high concentrations, at analysis rates of 2×105 cells/s, and at flow rates of 10 mL/min [48]. Such an instrument can analyze 10-15 parallel streams of cells in a variety of flow cell configurations and eventually provide up to 16 optical parameters. By implementing rPANR in a parallel acoustic flow cytometry system, the presently described methods can be used to pursue sorting with target cell concentrations of between $10^{-3}$ to $10^4$ target cells/mL from a concentration of 107 background cells/mL. Current sorters require pre-enrichment steps to sort such samples. FIG. 4 considers the use of a 10 stream Velocyt instrument as the basis for an rPANR process and extrapolates how it compares to conventional flow sorting with a pre-enrichment step.

According to various other embodiments the presently described detection systems and methods can provide multiparameter analysis of each cell. This can simply be multiparameter fluorescent analysis, index of refraction, or scatter where the cell is identified via the optical signal generated by one or more lasers. Additionally, other parameters such as cellular impedance, ultrasound response, or others could be combined to provide a sort signal based on the analysis of multiple cellular properties.

The specific methods and compositions described herein are representative of preferred embodiments and are exemplary and not intended as limitations on the scope of the invention. Other objects, aspects, and embodiments will occur to those skilled in the art upon consideration of this specification and are encompassed within the spirit of the invention as defined by the scope of the claims. It will be readily apparent to one skilled in the art that various substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. The methods and processes illustratively described herein suitably may be practiced in different orders of the steps, and they are not necessarily restricted to the orders of steps indicated herein or in the claims.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

All patents and publications referenced below and/or mentioned herein are indicative of the levels of skill of those skilled in the art to which the invention pertains, and each such referenced patent or publication is hereby incorporated by reference to the same extent as if it had been incorporated by reference in its entirety individually or set forth herein in its entirety. Applicants reserve the right to physically incorporate into this specification any and all materials and information from any such cited patents or publications.

REFERENCES

1. Piyasena, M. E. and S. W. Graves, The intersection of flow cytometry with microfluidics and microfabrication. Lab on a Chip, 2014. 14(6): p. 1044-1059.
2. Shields IV, C. W., C. D. Reyes, and G. P. López, Microfluidic cell sorting: a review of the advances in the separation of cells from debulking to rare cell isolation. Lab on a Chip, 2015. 15(5): p. 1230-1249.
3. Zborowski, M. and J. J. Chalmers, Rare cell separation and analysis by magnetic sorting. 2011, ACS Publications.
4. Brackenbury, W. J., High-Throughput, Low-Loss, Low-Cost and Label-Free Cell Separation using Electrophysiology Activated Cell Enrichment (EPACE). Proceedings of the National Academy of Sciences of the United States of America, 2017: p. 1-6.
5. Sequist, L. V., et al., The CTC-chip: an exciting new tool to detect circulating tumor cells in lung cancer patients. Journal of Thoracic Oncology, 2009. 4(3): p. 281-283.

6. Antfolk, M. and T. Laurell, Continuous flow microfluidic separation and processing of rare cells and bioparticles found in blood—A review. Analytica chimica acta, 2017. 965: p. 9-35.

7. Marshall, P. N., Flow cytometry lytic agent and method enabling 5-part leukocyte differential count. 1996, Google Patents.

8. Panaro, N. J., et al., Micropillar array chip for integrated white blood cell isolation and PCR. Biomolecular engineering, 2005. 21(6): p. 157-162.

9. Zheng, S., et al., 3D microfilter device for viable circulating tumor cell (CTC) enrichment from blood. Biomedical microdevices, 2011. 13(1): p. 203-213.

10. Williams, A., et al., Size-based enrichment technologies for CTC detection and characterization, in Minimal residual disease and circulating tumor cells in breast cancer. 2012, Springer. p. 87-95.

11. Coumans, F. A., et al., Filter characteristics influencing circulating tumor cell enrichment from whole blood. PloS one, 2013. 8(4): p. e61770.

12. Zavridou, M., et al., Molecular characterization of circulating tumor cells in head and neck squamous cell carcinoma: Direct comparison of a label-independent size-based microfluidic device with EpCAM-based CTC enrichment. 2019, AACR.

13. Salafi, T., Y. Zhang, and Y. Zhang, A Review on Deterministic Lateral Displacement for Particle Separation and Detection. Nano-Micro Letters, 2019. 11(1): p. 77.

14. Huang, L. R., et al., Continuous particle separation through deterministic lateral displacement. Science, 2004. 304(5673): p. 987-990.

15. Krüger, T., D. Holmes, and P. V. Coveney, Deformability-based red blood cell separation in deterministic lateral displacement devices—A simulation study. Biomicrofluidics, 2014. 8(5): p. 054114.

16. Di Carlo, D., et al., Continuous inertial focusing, ordering, and separation of particles in microchannels. Proceedings of the National Academy of Sciences, 2007. 104(48): p. 18892-18897.

17. Ozkumur, E., et al., Inertial focusing for tumor antigen-dependent and -independent sorting of rare circulating tumor cells. Science translational medicine, 2013. 5(179): p. 179ra47-179ra47.

18. Zhou, J. and I. Papautsky, Fundamentals of inertial focusing in microchannels. Lab on a Chip, 2013. 13(6): p. 1121-1132.

19. Kim, J.-A., et al., Inertial focusing in non-rectangular cross-section microchannels and manipulation of accessible focusing positions. Lab on a Chip, 2016. 16(6): p. 992-1001.

20. Zhang, J., et al., Fundamentals and applications of inertial microfluidics: a review. Lab on a Chip, 2016. 16(1): p. 10-34.

21. Petersson, F., et al., Free flow acoustophoresis: microfluidic-based mode of particle and cell separation. Analytical chemistry, 2007. 79(14): p. 5117-5123.

22. Magnusson, C., et al., Clinical-Scale cell-surface-marker independent acoustic microfluidic enrichment of tumor cells from blood. Analytical chemistry, 2017. 89(22): p. 11954-11961.

23. Lenshof, A., et al., Acoustic Cell Manipulation, in Microtechnology for Cell Manipulation and Sorting. 2017, Springer. p. 129-173.

24. Gascoyne, P. R. and J. Vykoukal, Particle separation by dielectrophoresis. Electrophoresis, 2002. 23(13): p. 1973-1983.

25. Gascoyne, P. R., et al., Dielectrophoretic separation of cancer cells from blood. IEEE transactions on industry applications, 1997. 33(3): p. 670-678.

26. Hughes, M. P., Fifty years of dielectrophoretic cell separation technology. Biomicrofluidics, 2016. 10(3): p. 032801.

27. Miltenyi, S., et al., High gradient magnetic cell separation with MACS. Cytometry: The Journal of the International Society for Analytical Cytology, 1990. 11(2): p. 231-238.

28. Wang, X. and I. Rivière, Clinical manufacturing of CAR T cells: foundation of a promising therapy. Molecular Therapy-Oncolytics, 2016. 3: p. 16015.

29. Holt, L. M., S. T. Stoyanof, and M. L. Olsen, Magnetic Cell Sorting for In Vivo and In Vitro Astrocyte, Neuron, and Microglia Analysis. Current Protocols in Neuroscience, 2019. 88(1): p. e71.

30. Robinson, J. P. and M. Roederer, Flow cytometry strikes gold. Science, 2015. 350(6262): p. 739-740.

31. Perfetto, S. P., P. K. Chattopadhyay, and M. Roederer, Seventeen-colour flow cytometry: unravelling the immune system. Nature Reviews Immunology, 2004. 4(8): p. 648.

32. Shapiro, H. M., Practical flow cytometry. 2005: John Wiley & Sons.

33. Foster, J. S., et al., Method and apparatus for sorting particles with a MEMS device. 2007, Google Patents.

34. Cossarizza, A., et al., Guidelines for the use of flow cytometry and cell sorting in immunological studies. European journal of immunology, 2017. 47(10): p. 1584-1797.

35. Chung, K. H., M. M. Crane, and H. Lu, Automated on-chip rapid microscopy, phenotyping and sorting of C. elegans. Nature Methods, 2008. 5(7): p. 637-643.

36. Pulak, R., Techniques for analysis, sorting, and dispensing of C-elegans on the COPAS™ flow-sorting system, in Methods in Molecular Biology, K. Strange, Editor. 2006, Humana Press Inc, 999 Riverview Dr, Ste 208, Totowa, N.J. 07512-1165 USA. p. 275-286.

37. Dalili, A., E. Samiei, and M. Hoorfar, A review of sorting, separation and isolation of cells and microbeads for biomedical applications: microfluidic approaches. Analyst, 2019. 144(1): p. 87-113.

38. Johnson, E. S., et al., Isolating Rare Cells and Circulating Tumor Cells with High Purity by Sequential eDAR. Analytical Chemistry, 2019. 91(22): p. 14605-14610.

39. Zhao, M. X., P. G. Schiro, and D. T. Chiu, ENSEMBLE-DECISION ALIQUOT RANKING (eDAR) FOR CTC ISOLATION AND ANALYSIS, in Circulating Tumor Cells: Isolation and Analysis, Z. H. Fan, Editor. 2016, John Wiley & Sons Inc: Hoboken. p. 53-83.

40. Schmid, L., D. A. Weitz, and T. Franke, Sorting drops and cells with acoustics: acoustic microfluidic fluorescence-activated cell sorter. Lab on a Chip, 2014. 14(19): p. 3710-3718.

41. Ding, X. Y., et al., Standing surface acoustic wave (SSAW) based multichannel cell sorting. Lab on a Chip, 2012. 12(21): p. 4228-4231.

42. Jakobsson, O., et al., Acoustic actuated fluorescence activated sorting of microparticles (vol 14, pg 1943, 2014). Lab on a Chip, 2015. 15(24): p. 4625-4625.

43. Applegate, R. W., et al., Microfluidic sorting system based on optical waveguide integration and diode laser bar trapping. Lab on a Chip, 2006. 6(3): p. 422-426.

44. Goddard, G. R., et al., Analytical performance of an ultrasonic particle focusing flow cytometer. Analytical Chemistry, 2007. 79(22): p. 8740-8746.

45. Goddard, G., et al., Ultrasonic particle-concentration for sheathless focusing of particles for analysis in a flow cytometer. Cytometry Part A, 2006. 69A(2): p. 66-74.

46. Piyasena, M. E., et al., Multinode Acoustic Focusing for Parallel Flow Cytometry. Analytical Chemistry, 2012. 84(4): p. 1831-1839.

47. Suthanthiraraj, P. P. A., et al., One-dimensional acoustic standing waves in rectangular channels for flow cytometry. Methods, 2012. 57(3): p. 259-271.

48. Kalb, D. M., et al., Line-Focused Optical Excitation of Parallel Acoustic Focused Sample Streams for High Volumetric and Analytical Rate Flow Cytometry. Analytical Chemistry, 2017. 89(18): p. 9967-9975.

49. Ward, M. D. and G. Kaduchak, Fundamentals of Acoustic Cytometry. Current protocols in cytometry, 2018. 84(1): p. e36.

50. Bhattacharjee, N., et al., The upcoming 3D-printing revolution in microfluidics. Lab on a Chip, 2016. 16(10): p. 1720-1742.

What is claimed is:

1. A system for sorting and/or enriching a target particle of interest in a fluid sample comprising:

a flow channel having an interrogation zone and an end that bifurcates into a collection channel and rejection channel, wherein the rejection channel comprises a valve;

a positioning device that positions particles in the flow channel such that when the valve is open, the particles in the flow channel will flow into the rejection channel but not into the collection channel;

a detection device that interrogates particles within the interrogation zone, wherein the detection device is in communication with the valve;

wherein detection of a target particle of interest within the interrogation zone by the detection device results in the valve closing, forcing the target particle of interest and all fluid in the channel to flow into the collection channel:

wherein a portion of the fluid sample not comprising particles flows into the collection channel when the valve is open; and wherein the collection channel is fluidly connected to an inlet that returns the flow containing collected particles to the flow channel upstream from the interrogation zone.

2. The system of claim 1 wherein the positioning device uses an acoustic standing wave to position the particles in the flow channel.

3. The system of claim 1 wherein the positioning device uses inertial focusing to position the particles in the flow channel.

4. The system of claim 1 wherein the positioning devices uses dielectrophoretic focusing to position the particles in the flow channel.

5. The system of claim 1 wherein the positioning device is a piezoelectric transducer.

6. The system of claim 1 wherein the detection device is an optical detection device.

7. The system of claim 1 wherein the detection device includes a laser beam through which the particles pass and the detection device detects optical signals emitted by the particles.

8. The system of claim 1 wherein the detection device uses imaging to detect the particle of interest.

9. The system of claim 1 wherein the detection devices uses ultrasound to detect the particle of interest.

10. The system of claim 1 further comprising a series of flow channels so as to interrogate multiple samples in parallel.

11. A method for sorting or enriching a target particle of interest in a fluid sample comprising:

providing a Positionally Assisted Negative particle Rejection (PANR) system comprising:

a flow channel having an interrogation zone and an end that bifurcates into a collection channel and rejection channel, wherein the rejection channel comprises a valve;

a positioning device that positions particles in the flow channel such that when the valve is open, the particles in the flow channel will flow into the rejection channel but not into the collection channel;

a detection device that interrogates particles within the interrogation zone, wherein the detection device is in communication with the valve;

wherein detection of a target particle of interest within the interrogation zone by the detection device results in the valve closing, forcing the target particle of interest to flow into the collection channel;

delivering the fluid sample to the flow channel for interrogation and collection;

collecting the contents of the collection channel;

delivering the collected contents of the collection channel back to the flow channel; and performing subsequent rounds of interrogation and collection until a desired level of sorting and/or enrichment has been reached.

12. The method of claim 11 further comprising concentrating the collected particles.

13. The method of claim 11 wherein the particles of interest are cells.

14. The method of claim 11 wherein the particles of interest are multicellular aggregates.

15. The method of claim 11 wherein the particles of interest are small organisms.

16. The method of claim 11 wherein the particles of interest are nanoparticles.

17. The method of claim 11 wherein the particles are microspheres or nanospheres.

18. The method of claim 11 wherein the device is configured such that a portion of the fluid sample not comprising particles flows into the collection channel when the valve is open.

* * * * *